US006823307B1

United States Patent
Steinbiss et al.

(10) Patent No.: US 6,823,307 B1
(45) Date of Patent: Nov. 23, 2004

(54) LANGUAGE MODEL BASED ON THE SPEECH RECOGNITION HISTORY

(75) Inventors: Volker Steinbiss, Aachen (DE); Dietrich Klakow, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/622,317

(22) PCT Filed: Dec. 16, 1999

(86) PCT No.: PCT/EP99/10181

§ 371 (c)(1),
(2), (4) Date: Aug. 14, 2000

(87) PCT Pub. No.: WO00/38175

PCT Pub. Date: Jun. 29, 2000

(30) Foreign Application Priority Data

Dec. 21, 1998 (EP) .......................... 98204354

(51) Int. Cl.[7] .............................. G10L 15/04
(52) U.S. Cl. ..................... 704/252; 704/251
(58) Field of Search .............. 704/238, 239, 704/240, 241, 242, 243, 244, 251–257

(56) References Cited

U.S. PATENT DOCUMENTS 5,937,383 A * 8/1999 Ittycheriah et al. ......... 704/255
6,070,229 A * 5/2000 Voss ........................... 711/118
6,195,641 B1 * 2/2001 Loring et al. ............... 704/275
6,456,971 B1 * 9/2002 Mohri et al. ................ 704/275

OTHER PUBLICATIONS

Ney, Hermann et al.; On structuring probabilistic dependences in stochastic language modelling; Academic Press Limited; pp. 1–38, Jan. 1994.*

* cited by examiner

Primary Examiner—Richemond Dorvil
Assistant Examiner—Abul K. Azad

(57) ABSTRACT

A small vocabulary pattern recognition system is used for recognizing a sequence of words, such as a sequence of digits (e.g. telephone number) or a sequence of commands. A representation of reference words is stored in a vocabulary 132, 134. Input means 110 are used for receiving a time-sequential input pattern representative of a spoken or written word sequence. A pattern recognizer 120 comprises a word-level matching unit 130 for generating a plurality of possible sequences of words by statistically comparing the input pattern to the representations of the reference words of the vocabulary 132, 134. A cache 150 is used for storing a plurality of most recently recognized words. A sequence-level matching unit 140 selects a word sequence from the plurality of sequences of words in dependence on a statistical language model which provides a probability of a sequence of M words, $M \geq 2$. The probability depends on a frequency of occurrence of the sequence in the cache. In this way for many small vocabulary systems where no reliable data is available on frequency of use of word sequences, the cache is used to provide data representative of the actual use.

9 Claims, 3 Drawing Sheets

LANGUAGE MODEL BASED ON THE SPEECH RECOGNITION HISTORY

BACKGROUND OF THE INVENTION

The invention relates to a small vocabulary pattern recognition system for recognizing a sequence of words; the vocabulary storing a representation of a plurality of reference words; the system comprising:
- input means for receiving a time-sequential input pattern representative of a spoken or written word sequence;
- a pattern recognizer comprising a word-level matching unit for generating a plurality of sequences of words by statistically comparing the input pattern to the representations of the reference words of the vocabulary.

Increasingly use is made of small vocabulary pattern recognition systems for recognizing sequences of words, such as digit strings or command sequences. Such systems are, for instance, used for voice control of communication, computer or audio/video equipment. As an example, a user can make a phone call by speaking a telephone number, possibly followed by a spoken "dial" instruction. Also a computer operating system and the various application programs can be operated via voice commands. Besides being used for recognizing speech representative input, the invention covers also small vocabulary character/word recognition systems like handwriting recognition system, where the input signal represents a written or printed character/word. The system may, for instance, be used for recognizing written/typed digit strings like account numbers. A small vocabulary system typically has a vocabulary in the range of up to a few hundred entries, referred to as words. In fact, such a word may be represent a single character like a digit for digit string recognition or a command, which actually may be formed by more than one spoken/printed word (such as "save file") for recognition of command sequences. Normally recognition of an input pattern, such as sampled speech or handwriting, takes place in two steps. In the first step, a segment of the input signal which represents a word is compared against trained material. Since variations occur in speaking, writing, or printing of words, the first step comparison results in identifying several possible words of the vocabulary which in a statistical sense match the input signal segment. Consequently, the first step recognition of an input signal results in identifying several sequences of candidate words. These sequences may be represented using a graph. Usually, the sequences have been given a statistical likelihood reflecting how well the input pattern matches the individual reference words. In a second step, a most likely sequence is selected based on the likelihood of the sequence (in combination with the already established likelihood of the individual word-matching). For large vocabulary systems, the second step is usually based on a statistical language model, which provides statistical information on occurrence of a word or word sequence in a typical text. Such a system is disclosed in L.Rabiner, B-H. Juang, "Fundamentals of speech recognition", Prentice Hall 1993, pages 434 to 454. Frequently, so-called bigrams are used which specify the likelihood of occurrence of a word pair. The language model is built up-front by analyzing large text corpora with several millions of words representative for the word sequences to be recognized. In some systems, the built-in language model can be updated during use of the system.

For small vocabulary systems, the initial identification of word candidates is simpler than for large vocabulary systems since the vocabulary and the amount of trained material is smaller. For instance, for recognizing a digit string, such as a telephone number, the vocabulary can be a small as representing only ten digits. However, the second step of selecting and filtering between possible sequences is difficult to perform for many applications. The number of different telephone numbers occurring in a country or even worldwide is huge. Moreover, besides a few frequently used numbers, many numbers are used with a similar frequency resulting in a low level of statistical discrimination. Similarly, for command and control of a computer a user can select between a very large number of valid command sequences and hardly any a-priori knowledge exists of frequently used sequences. Therefore, it is difficult to create and use a conventional large vocabulary language model for most small vocabulary systems. Instead, small vocabulary systems may use finite state models, where a state corresponds to a word, to restrict the possible word sequences to transitions of the model. Typically, all words have been assigned an equal likelihood and no distinction in likelihood is made between word sequences allowed according to the finite state model.

SUMMARY OF THE INVENTION

It is an object of the invention to provide a small vocabulary pattern recognition system of the kind set forth which is better capable of selecting between candidate sequences of words.

To meet the object of the invention, the system includes a cache for storing a plurality of most recently recognized words; and the speech recognizer comprises a sequence-level matching unit for selecting a word sequence from the plurality of sequences of words in dependence on a statistical language model which provides a probability of a sequence of M words, $M \geq 2$; the probability depending on a frequency of occurrence of the sequence in the cache. By using a cache, the system keeps track of the most recent behavior of the user. Although the total number of word sequences, such as telephone numbers, may be huge and it may be difficult to statistically discriminate between the numbers in a general manner, this tends not to be the case for individual users. For instance, usually the set of telephone numbers used by an individual is limited to less than hundred. Moreover, some numbers are used much more frequently than others are. Similarly, for command and control it may be difficult to establish generally used sequences of command. However, many individual users have certain preferred ways of operating equipment. This typical user behavior can be 'captured' effectively in the cache. For instance, a user who regularly watches a web-page on stocks, probably will regularly issue the command sequence "'open explorer', 'favorites', 'stock'". By storing this sequence of three commands in the cache, this sequence can be selected as being more likely than most other 3-command sequences. By using the data stored in the cache for the language model, a language model is used which adapts to the individual user and to recent behavior of the user. Preferably, a word sequence is only stored in the cache if the word sequence has been 'successfully' recognized, e.g. the recognized telephone number resulted in a telephone connection being made.

In an embodiment as defined in the dependent claim 2, a backing-off strategy is used where the language model provides a non-zero probability for both cache-hits and cache-misses. In this way, word sequences which result in a cache miss still have a reasonable chance of being selected and not being suppressed by a word sequence which in the first recognition step was identified as less likely (e.g. phonetically less similar) but is present in the cache (and consequently gets an increased likelihood by using the language model). This also allows the use of a relatively small cache.

In an embodiment as defined in the dependent claim 3, a normalized value is used for cache-misses. Moreover, the likelihood for cache hits converges to the normalized value as the number of occurrences in the cache decreases. This provides a smooth transition in probability between cache-hits and cache-misses.

In an embodiment as defined in the dependent claim 4, a discounting parameter is used to reduce the impact of cache-hits on the probability, smoothing the probabilities further.

BRIEF DESCRIPTION OF THE DRAWINGS

These and other aspect s of the invention will be apparent from and elucidated with reference to the embodiments shown in the drawings.

In an embodiment as defined in the dependent claim 5, a simple language model is used for selecting between strings (or sub-strings) by comparing the entire (sub-)string to individual words in the cache. The relative number of cache-hits, in combination with smoothing operations, provides the probability of the (sub-)string.

Figure 1:
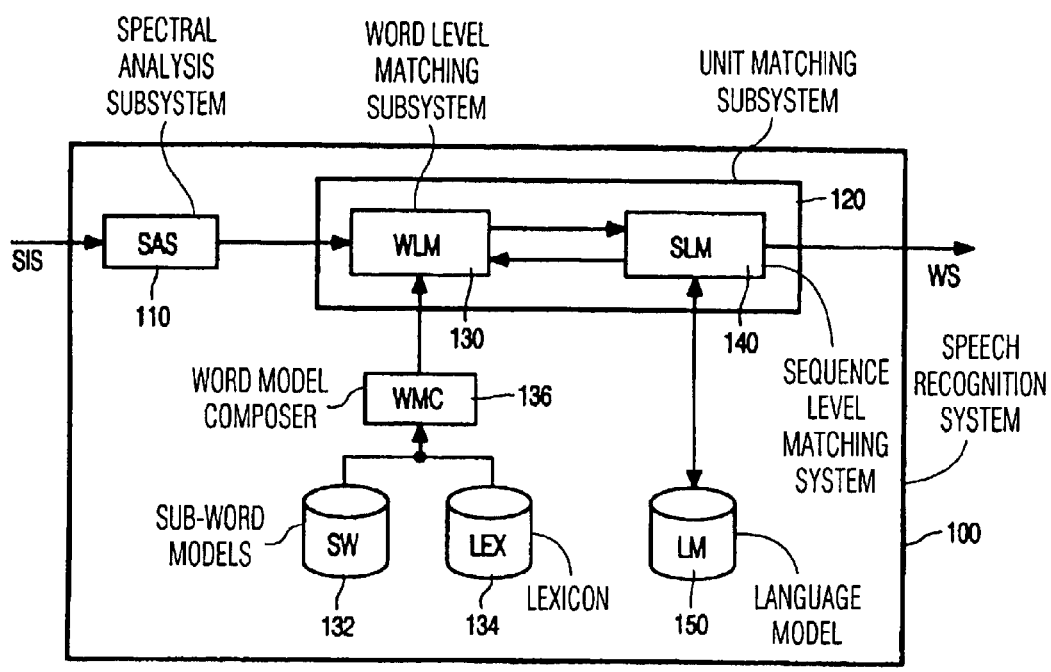

In an embodiment as defined in the dependent claim 6, an M-gram language model is used, allowing comparison of only M words to the cache (or less than M if the sequence is still shorter) instead of the entire sequence. Advantageously, in case of a cache miss for the M word sequence, a backing off to a shorter sequence (of M-1 words) is used. Particularly for telephone numbers this allows better recognition of local numbers starting with a same digit sequence, even if the specific number is not yet in the cache.

In an embodiment as defined in the dependent claim 7, a special symbol is used (and preferably also stored in the cache for each recognized sequence) to separate between sequences. For instance, if a special beginning of sequence symbol is used, a new sequence (with that special symbol and some more following words) automatically will result in hits only if the words actually occur at the same place in the sequence.

Preferably, at least a trigram is used, allowing for good discrimination of the possible word sequences. Advantageously, a four-gram or five-gram is used, which provides a good balance between accurate selection and correctness of the language model using a relatively small cache of, for instance, 100 entries.

These and other aspects of the invention will be apparent from and elucidated with reference to the embodiments shown in the drawings.

Figure 3:
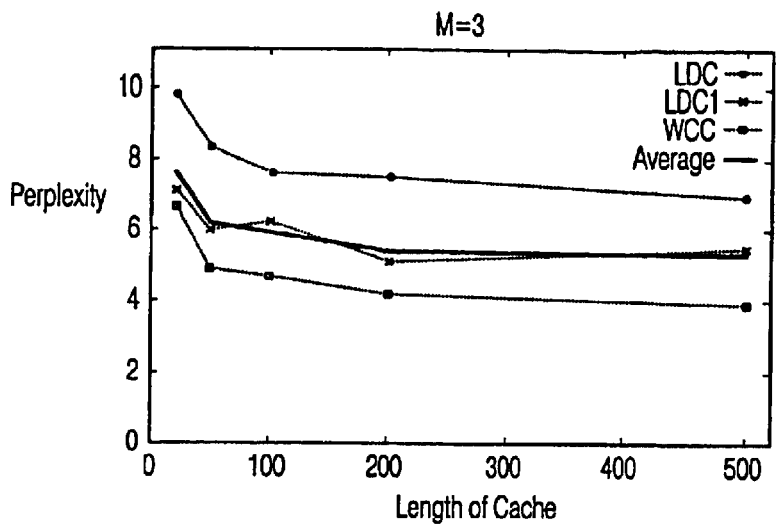
Figure 4:
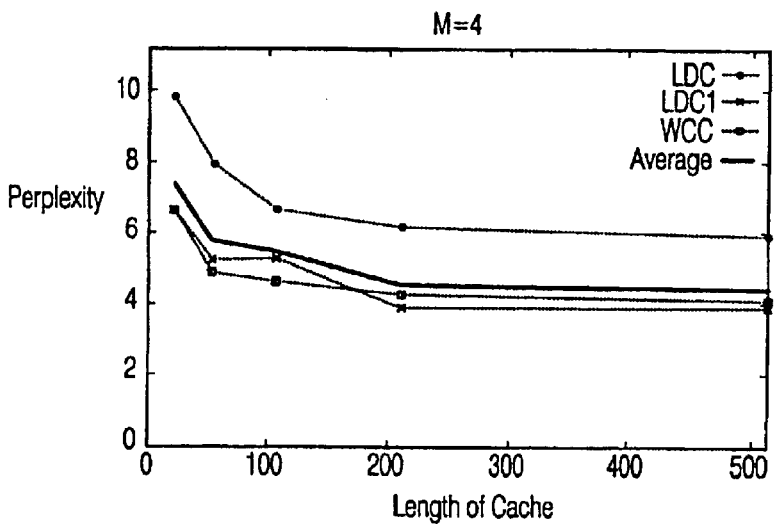

FIG. 1 shows a block diagram of a pattern recognition system according to the invention;

FIG. 2 illustrates word models used for acoustic recognition;

FIG. 3 shows the results for using a trigram cache model;

FIG. 4 shows the results for using a fourgram cache model; and

DETAILED DESCRIPTION OF THE INVENTION

FIG. 1 shows a block diagram of a small vocabulary pattern recognition system 100 according to the invention for recognizing sequences of words, such as digit strings or command sequences. The recognition technique according to the invention can be used in a speech recognition system as well as a recognition system for recognizing written or typed words. As an example, FIG. 1 illustrates a continuous speech recognition system 100. The technique according to the invention may equally well be used for discrete speech recognition systems. Systems of similar structure as shown in FIG. 1 are known for recognizing handwriting or printed text. The speech recognition system 100 of FIG. 1 comprises a spectral analysis subsystem 110 and a unit matching subsystem 120. In the spectral analysis subsystem 110 the speech input signal (SIS) is spectrally and/or temporally analyzed to calculate a representative vector of features (observation vector, OV). Typically, the speech signal is digitized (e.g. sampled at a rate of 6.67 kHz.) and pre-processed, for instance by applying pre-emphasis. Consecutive samples are grouped (blocked) into frames, corresponding to, for instance, 32 msec. of speech signal. Successive frames partially overlap, for instance, 16 msec. Often the Linear Predictive Coding (LPC) spectral an alysis method is used to calculate for each frame a representative vector of features (observation vector). The feature vector may, for instance, have 24, 32 or 63 components. Many speech recognition systems assume a probabilistic model of speech production, whereby a specified word sequence $W=w_1w_2w_3 \ldots w_q$ produces a sequence of acoustic observation vectors $Y=y_1y_2y_3 \ldots y_T$. The recognition error can be statistically minimized by determining the sequence of words $w_1w_2w_3 \ldots w_q$ which most probably caused the observed sequence of observation vectors $y_1y_2y_3 \ldots y_T$ (over time t=1, . . . , T), where the observation vectors are the outcome of the spectral analysis subsystem 210. This results in determining the maximum a posteriori probability:

max $P(W|Y)$, for all possible word sequences W

By applying Bayes' theorem on conditional probabilities, $P(W|Y)$ is given by:

$$P(W|Y)=P(Y|W).P(W)/P(Y)$$

Since P(Y) is independent of W, the most probable word sequence is given by:

$$\arg\max P(Y|W).P(W) \text{ for all possible word sequences W} \quad (1)$$

In the unit matching subsystem 120, an acoustic model provides the first term of equation (1). The acoustic model is used to estimate the probability $P(Y|W)$ of a sequence of observation vectors Y for a given word string W. This may be performed by the unit matching subsystem 120 matching the observation vectors against an inventory of speech recognition units. A speech recognition unit is represented by a sequence of acoustic references. Various forms of speech recognition units may be used. As an example, a whole word or even a group of words, such as a command consisting of more than one word, may be represented by one speech recognition unit. A word model (WM) provides for each word of a given vocabulary a transcription in a sequence of acoustic references. In most small vocabulary systems, a whole word is represented by a speech recognition unit, in which case a direct relationship exists between the word model and the speech recognition unit. In other small vocabulary systems, for instance used for recognizing a relatively high number (e.g. several hundreds) of commands, for the speech recognition unit use can be made of linguistically based sub-word units, such as phones, diphones or syllables, as well as derivative units, such as fenenes and fenones. For the latter category of systems, a word model may be given by a lexicon 134, describing the sequence of sub-word units relating to a word of the vocabulary, and the sub-word models 132, describing sequences of acoustic references of the involved speech recognition unit. A word model composer 136 composes the word model based on the subword model 132 and the lexicon 134.

Figure 2A:
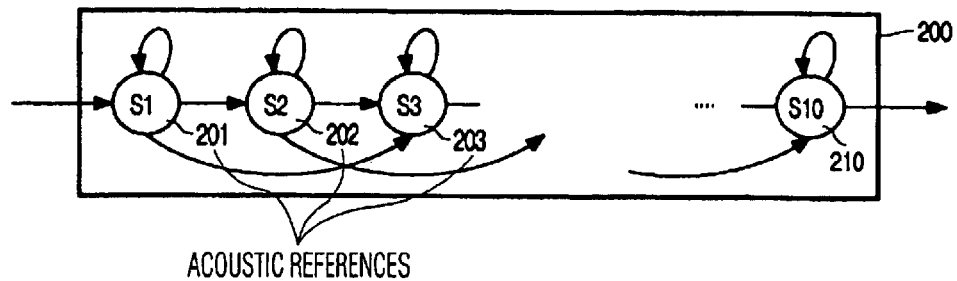
Figure 2B:
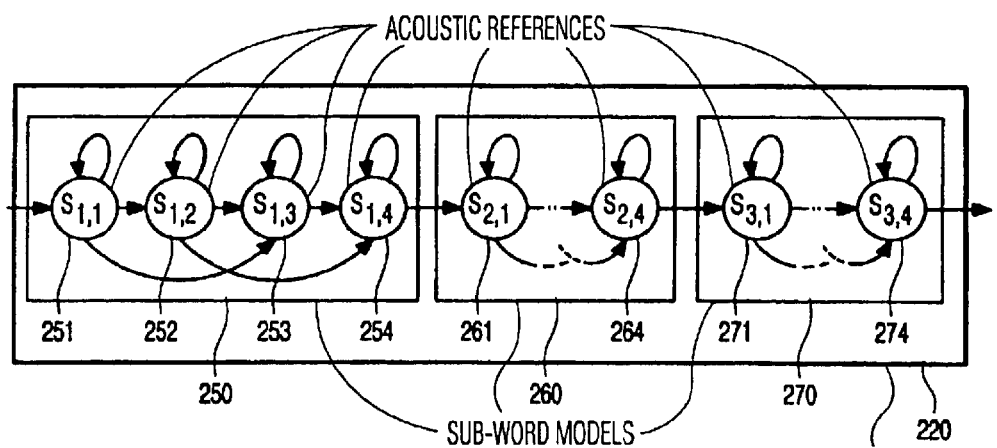

FIG. 2A illustrates a word model 200 for a system based on whole-word speech recognition units, where the speech recognition unit of the shown word is modeled using a sequence of ten acoustic references (201 to 210). FIG. 2B illustrates a word model 220 for a system based on sub-word units, where the shown word is modeled by a sequence of three sub-word models (250, 260 and 270), each with a sequence of four acoustic references (251, 252, 253, 254; 261 to 264; 271 to 274). The word models shown in FIG. 2 are based on Hidden Markov Models, which are widely used to stochastically model speech and handwriting signals. Using this model, each recognition unit (word model or sub-word model) is typically characterized by an HMM, whose parameters are estimated from a training set of data. Usually a limited set of, for instance 40, sub-word units is used, since it would require a lot of training data to adequately train an HMM for larger units. An NMM state corresponds to an acoustic reference (for speech recognition) or an allographic reference (for handwriting recognition). Various techniques are known for modeling a reference, including discrete or continuous probability densities.

A word level matching system 130 as shown in FIG. 1 matches the observation vectors against all sequences of speech recognition units and provides the likelihoods of a match between the vector and a sequence. If sub-word units are used, constraints are placed on the matching by using the lexicon 134 to limit the possible sequence of sub-word units to sequences in the lexicon 134. This reduces the outcome to possible sequences of words. According to the invention, a sequence level matching system 140 uses a language model 150 (LM) to place further constraints on the matching so that the paths investigated are those orresponding to word sequences which are likely sequences as specified by the language model. In this way, the outcome of the unit matching subsystem 120 is a recognized word sequence (RS), such as a digit string (e.g. telephone number) or multi-word command. In the system according to the invention which is targeted towards small vocabulary recognition with many possible word sequences, in principle no word sequence is ruled out by the language model. Since on some sequences no reliable statistical data is available (not form general sources, nor from the specific use by the user, those sequences are simply considered less likely (but still possible). Unlike large vocabulary systems, the recognition is not limited to word sequences explicitly known to the language model.

According to the invention, the language model 150 is a statistical language model which provides a probability of a sequence of M words, M≧2. The probability of a word sequence depends on a frequency of occurrence of the sequence in the cache. By using a cache, the system adapts to a specific user and at the same time keeps track of the most recent behavior of the user. The speech recognizer 100 stores the recognized word sequence in the cache. Preferably, a word sequence is only stored in the cache if the word sequence has been 'successfully' recognized, e.g. the recognized telephone number resulted in a telephone connection being established. In most small vocabulary systems the cache has to be restricted in size in view of the costs (e.g. when used in a portable telephone). In such systems the cache is preferable operated in a 'first in-first out' (FEFO) manner. Once the cache has been fully filled, each time the system loads a newly recognized word sequence into the cache, the word sequence (or several word sequences if the new word sequence is larger) which was longest in the cache is removed. Advantageously, a few storage slots in the cache are reserved for permanent use. In such slots the user can store important word sequences which are not used frequently. As an example, the user could store the emergency telephone number in such a slot. Particularly, for voice dialing of telephone numbers it is preferred that the system also allows frequently used word sequences (e.g. telephone numbers) to be dialed via an easier to remember or shorter word (or word sequence). For instance, the telephone numbers of family and friends may be stored in association with a voice command, like a name of the family member or friend. Preferably, it is possible to store several alternative voice commands in association with one telephone number (or, more in general, one word sequence). For important, but infrequently used word sequences it may be difficult to remember the stored associated voice command. For instance, it may be difficult to remember whether the emergency telephone number was stored in association with the voice command 'emergency', 'police', 'fire brigade', 'ambulance', or 'hospital' or even a different name. It is, therefore, advantageous to store the infrequently used word sequence permanently in the cache, allowing the word sequence to be spoken in full, which in the case of the emergency number usually comes down to speaking a relatively short, well-known telephone number.

In the remainder two preferred language models are given. Persons skilled in the art will be able to design alternative language models by varying the models give. The given models share the following concepts. It will be appreciated that alternative models may but need not use the same concepts.

The probability of a word sequence depends on whether or not the word sequence occurs in the cache. In both cases, a non-zero probability is used. In this way, in principle every word in the vocabulary, even if not present in the cache, can be recognized.

To ensure a smooth transition between the probability of the word sequence for the cases where the sequence is in the cache and where the sequence is not in the cache, the probability of a word sequence is given by:

a normalized, non-zero value if the word sequence does not occur in the cache; and a summation of the normalized value and a frequency-related term which depends on a number of occurrences of the word sequence in the cache, otherwise.

Preferably, the frequency related term provides a contribution to the probability which converges to zero as the number of occurrences decreases to zero and which increases as the number of occurrences increases (optionally, limited to a maximum probability).

To ensure that the probability of word sequences in the cache are not overrated, in the frequency-related term a discounting parameter D is included which is subtracted from the number of occurrences of the word sequence in the cache or from the probability.

The language model 150 provides the probability of a word sequence $W=w_1w_2w_3 \ldots w_q$, which in principle is given by:

$$P(W)=P(w_1)P(w_2|w_1).P(w_3|w_1w_2) \ldots P(w_q|w_1w_2w_3 \ldots w_q).$$

The term P(W), which specifies the second term of equation (1) is approximated by the two following models. Both models are oriented towards digit string recognition (i.e. a word represents a digit), but may equally well be used for other forms of small vocabulary recognition of word sequences.

Complete Sequence Cache Model

In this model, the cache is adapted to store the last L recognized word sequences. The word sequences in the cache can be identified. Each word sequence is limited to a predetermined sequence length MAX. For most telephone numbers, a practical limit of 14 digits in a sequence may be used. The cache may be structured in a simple way with L storage locations, which each can hold a full sequence (of up to MAX words/digits). Since in many situations, the sequence will be shorter than the maximum allowed length, also other cache arrangements may be used. For instance, a table with L entries may be used which serve as an index (pointers) to a larger table wherein the actual sequences are stored. Assuming an average sequence length which is much shorter than MAX, in this way with a same storage space more entries can be stored (L can be larger).

The language model specifies the conditional probability of a sequence s of words up to the length MAX as:

$$P(s) = \begin{cases} \frac{n(s) - D}{L} + \gamma & \text{if } s \text{ is a cache hit} \\ \gamma & \text{else;} \end{cases}$$

In this formula, n(s) is the number of occurrences of the word sequence s in the cache. D is the discounting parameter. $\gamma$ is the normalized value which can be found by in a conventional way normalizing the probabilities of the word sequences to an overall accumulated probability of 1.

The language model can be used to assist in recognizing the entire sequence. Alternatively, when only part of the sequence has been processed using the acoustic model, the so-far identified possible sequences can be processed using the same model, where s then represents the sub-string identified so-far.

M-gram Cache Model

In this model, the probability of a sequence is based on the last M words of the sequence. The language model specifies the conditional probability of a word wi, given a preceding sequence of words $w_{i-1} \ldots w_{i-M+1}$ as:

$$P(w_i|w_{i-1} \ldots w_{i-M+1}) = \begin{cases} \frac{n(w_i \ldots w_{i-M+1}) - D_M}{n(w_{i-1} \ldots w_{i-M+1})} + & \text{if } w_i \ldots w_{i-M+1} \\ \gamma(w_{i-1} \ldots w_{i-M+1})P(w_i|w_{i-1} \ldots w_{i-M+2}) & \text{is a cache hit} \\ \gamma(w_{i-1} \ldots w_{i-M+1})P(w_i|w_{i-1} \ldots w_{i-M+2}) & \text{else;} \end{cases}$$

where $n(w_i \ldots w_{i-M+1})$ is the number of occurrences of the word sequence $w_i \ldots w_{i-M+1}$ in the cache, $\gamma(w_{i-1} \ldots w_{i-M+1})$ $P(w_i|w_{i-1} \ldots w_{i-M+2})$ is the normalized value, DM is the discounting parameter.

For recognition of telephone numbers, a cache for storing 500 digits was found to be adequate. Depending on the value of M, the discounting parameter DM can be chosen such that best results are achieved. Good results where achieved with: $D_2=0.96$, $D_3=0.97$ and $D_4=0.27$.

In principle, all recently recognized word sequences may simply be concatenated in the cache. Since only M words of the sequences are used, no full comparison between a sequence produced by the acoustic model and the sequences stored in the cache is required. As such the cache needs not to 'have a particular structure which allows easy identification of the beginning (and/or end) of the sequences. By simply concatenating the sequences in the cache, many sequences can be stored if frequently short sequences are used. By allowing the sub-sequence of M-words to occur in principle anywhere in the stored sequences, in particular for command and control applications, wherein certain sub-sequences of words occur in several larger sequences, the sub-sequences can be recognized better.

In a preferred embodiment, the cache is structured by using a separate unique word-separator to represent an end or beginning of a word sequence and store the word sequences including the word separator. In this way, in a simple manner word sequences can be identified in the cache, while still concatenating the sequences (and thus not wasting much space, with the exception of the word separator). This technique may also be used for the complete sequence cache model. Preferably, the word separator identifies the beginning of a word sequence. Particularly, in combination with the M-gram cache model, the word separator can be regarded as part of the sequence. In this way, M-subsequences will only be identified as being in the cache if the position of the input subsequence in the entire input sequence corresponds to the position of the subsequence in the stored sequence. This is especially useful for recognizing telephone numbers, where it is usually is important that the actual M-digits occur at the same position.

The M-gram cache model has been tested for recognizing telephone numbers as used by three persons. Users LDC and LDC1 frequently call long distance. WCC mainly calls 3-digit numbers within the company. The length of the phone numbers (including one phone number separating symbol) is given in the following table:

| Caller | Number of digits | Number of Calls | Average Length |
| --- | --- | --- | --- |
| LDC | 547 | 51 | 10.7 |
| LDC1 | 887 | 75 | 11.8 |
| WCC | 544 | 119 | 4.6 |
| Combined | 1978 | 245 | 8.1 |

FIG. 3 shows the results obtained for a trigram (M=3) cache, for the three persons and for various cache sizes (in digits). It can be seen that for cache sizes of 100 or 200 digits already a significant reduction in perplexity occurs. For a system without a cache the perplexity (expressing how many digits are likely to follow) is eleven in the case where 10 digits and one separating symbol are used. For the average of the three persons, the perplexity is reduced to approximately 5.8 for a 200-digit cache and to 5.7, using a 500-digit cache.

FIG. 4 shows the results obtained for a fourgram (M=4) cache. From both FIGS. 3 and 4 it is clear that all three person benefit from using the cache. However, the extent wherein varies. For M=3 and 4, particularly the person WCC who mainly uses short numbers benefits most. Since most numbers used by WCC were very short, the fourgram hardly gives any improvement over the trigram for WCC, whereas for LDC and LDC1 still an improvement can be observed.

Figure 5:
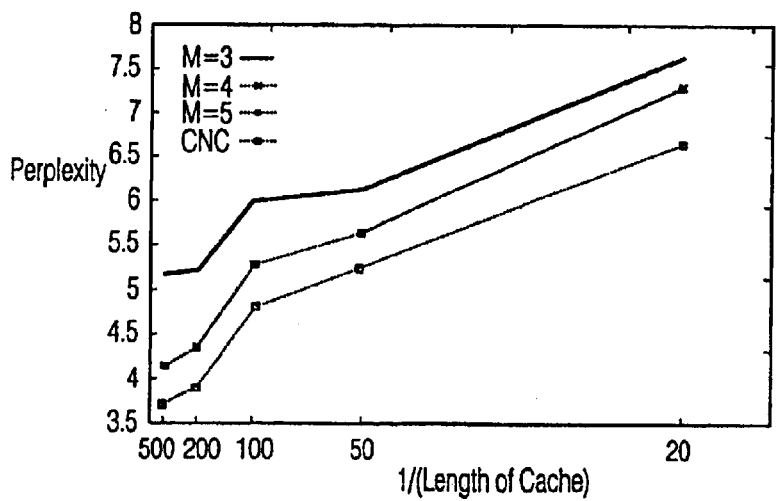

FIG. 5 shows the results for all three persons combined for various values of M and for various values of the cache. This confirms that, in general, using a fourgram offers a significant improvement compared to using a trigram. However, a fivegram achieves during the tests a same result as a fourgram. FIG. 5 also shows the result of using the complete sequence cache model, labeled as CNC in the figure. This model results in an even lower perplexity.

However, for certain applications it may be easier to use the M-gram models, since these models allow full freedom in the length of the sequence.

What is claimed is:

1. A small vocabulary pattern recognition system for recognizing a sequence of words; the vocabulary storing a representation of a plurality of reference words; the system comprising:

input means for receiving a time-sequential input pattern representative of a spoken or written word sequence;

a pattern recognizer comprising a word-level matching unit for generating a plurality of sequences of words by statistically comparing the input pattern to the representations of the reference words of the vocabulary;

a cache for storing a plurality of most recently recognized words and word sequence, said cache comprising a plurality of slots, wherein at least one or more slots are reserved for permanent use for storing infrequently retrieved user-designated critical word sequences that are spoken fully and not replaced by subsequently recognized words;

a sequence-level matching unit for selecting a word sequence from the plurality of sequences of words using a statistical language model which provides a probability of a word sequence; the probability depending on a frequency of occurrence and non-occurrence of the word sequence in the cache.

2. A system as claimed in claim 1, wherein the probability of a word sequence is given by:

a normalized, non-zero value if the word sequence does not occur in the cache; and a summation of the normalized value and a frequency-related term which depends on a number of occurrences of the word sequence in the cache, otherwise.

3. A system as claimed in claim 2, wherein the frequency-related term includes a discounting parameter D which is subtracted from the number of occurrences of the word sequence in the cache.

4. A system as claimed in claim 2, wherein the cache is adapted to store the last L recognized word sequences as identifiable word sequences; each word sequence being limited to a predetermined sequence length; the language model specifying the conditional probability of a sequence s of words up to the predetermined sequence length as:

$$P(s) = \begin{cases} \dfrac{n(s) - D}{L} + \gamma & \text{if } s \text{ is a cache hit} \\ \gamma & \text{else;} \end{cases}$$

where n(s) is the number of occurrences of the word sequence s in the cache, and $\gamma$ is the normalized value.

5. A system as claimed in claim 2, wherein the language model specifies the conditional probability of a word $w_i$, given a preceding sequence of words $w_{i-1} \ldots w_{i-M+1}$ as:

$$P(w_i | w_{i-1} \ldots w_{i-M+1}) = \begin{cases} \dfrac{n(w_i \ldots w_{i-M+1}) - D_M}{n(w_{i-1} \ldots w_{i-M+1})} + \\ \gamma(w_{i-1} \ldots w_{i-M+1}) P(w_i | w_{i-1} \ldots w_{i-M+2}) & \text{if } w_i \ldots w_{i-M+1} \text{ is a cache hit} \\ \gamma(w_{i-1} \ldots w_{i-M+1}) P(w_i | w_{i-1} \ldots w_{i-M+2}) & \text{else;} \end{cases}$$

where $n(w_i \ldots w_{i-M+1})$ is the number of occurrences of the word sequence $w_i \ldots w_{i-M+1}$ in the cache, and $\gamma(w_i \ldots w_{i-M+1}) P(w_i | w_{i-1} \ldots w_{i-M+2})$ is the normalized value.

6. A system as claimed in claim 5, wherein an end or beginning of a word sequence is represented as a separate unique wordeparator; the cache being adapted to store recently recognized word sequences including the word separator.

7. A system as claimed in claim 1, wherein the word sequence is at least three.

8. A system as claimed in claim 1, wherein the word sequence is four or five.

9. A system as claimed in claim 1, wherein a word represents a digit or a command.

* * * * *